United States Patent
Viviani

(10) Patent No.: US 10,852,113 B2
(45) Date of Patent: Dec. 1, 2020

(54) SEARCH AND PROTECT DEVICE FOR AIRBORNE TARGETS

(71) Applicant: BAE SYSTEMS INFORMATION AND ELECTRONIC SYSTEMS INTEGRATION INC., Nashua, NH (US)

(72) Inventor: Gary L. Viviani, Bastrop, TX (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 16/294,549

(22) Filed: Mar. 6, 2019

(65) Prior Publication Data

US 2020/0284566 A1 Sep. 10, 2020

(51) Int. Cl.
*F42B 12/38* (2006.01)
*G06K 9/00* (2006.01)
*B64C 39/02* (2006.01)

(52) U.S. Cl.
CPC .......... *F42B 12/382* (2013.01); *B64C 39/024* (2013.01); *G06K 9/00201* (2013.01); *B64C 2201/121* (2013.01)

(58) Field of Classification Search
CPC .......... F42B 12/385; B64C 39/024; B64C 2201/121; G06K 9/00201; G01C 3/08
USPC .......... 102/513; 356/3.01–3.15, 4.01–4.1, 356/5.01–5.15, 6–22, 28, 28.5
See application file for complete search history.

(56) References Cited

U.S. PATENT DOCUMENTS

| | | | | |
|---|---|---|---|---|
| 4,015,530 A | * | 4/1977 | Dick | F42C 13/02 102/213 |
| 4,522,356 A | * | 6/1985 | Lair | F41G 7/2233 102/489 |
| 6,584,879 B2 | * | 7/2003 | Gorman | F41H 11/02 89/1.11 |
| 7,436,493 B2 | * | 10/2008 | McConville | F42B 12/42 356/4.01 |
| 8,208,130 B2 | * | 6/2012 | McConville | F41A 33/02 356/3.01 |
| 9,513,371 B2 | * | 12/2016 | Zhang | B64C 39/024 |
| 2006/0232761 A1 | * | 10/2006 | McConville | F42B 12/42 356/5.1 |
| 2017/0185081 A1 | * | 6/2017 | Steele | G05D 1/0016 |
| 2017/0227956 A1 | * | 8/2017 | Cesarano | G05D 1/0088 |
| 2017/0302364 A1 | * | 10/2017 | Cesarano | G06K 9/00637 |

* cited by examiner

Primary Examiner — Samir Abdosh
(74) Attorney, Agent, or Firm — Sand, Sebolt & Wernow LPA; Scott J. Asmus

(57) ABSTRACT

The present disclosure relates to a search and protect device for airborne targets including projectiles. The disclosure is directed to a search and protect device for airborne threats of interest within a 360-degree field of view via a spinning device with range finders. The disclosure relates to a search and protect device that can autonomously determine threats and engage said threats with appropriate counter-measures by determining its future location through the use of range finders within an at least three sensor array with a rotating path of a given speed to protect a target. The location of the projectile may be determined using a distance formula and further trigonometry.

14 Claims, 14 Drawing Sheets

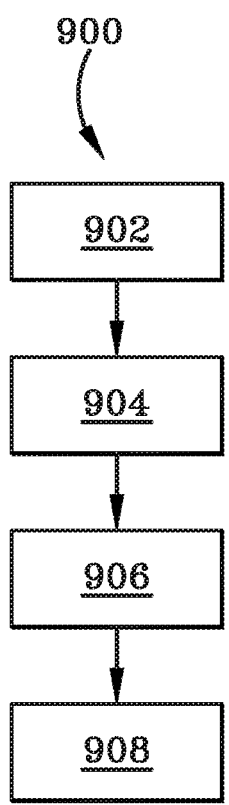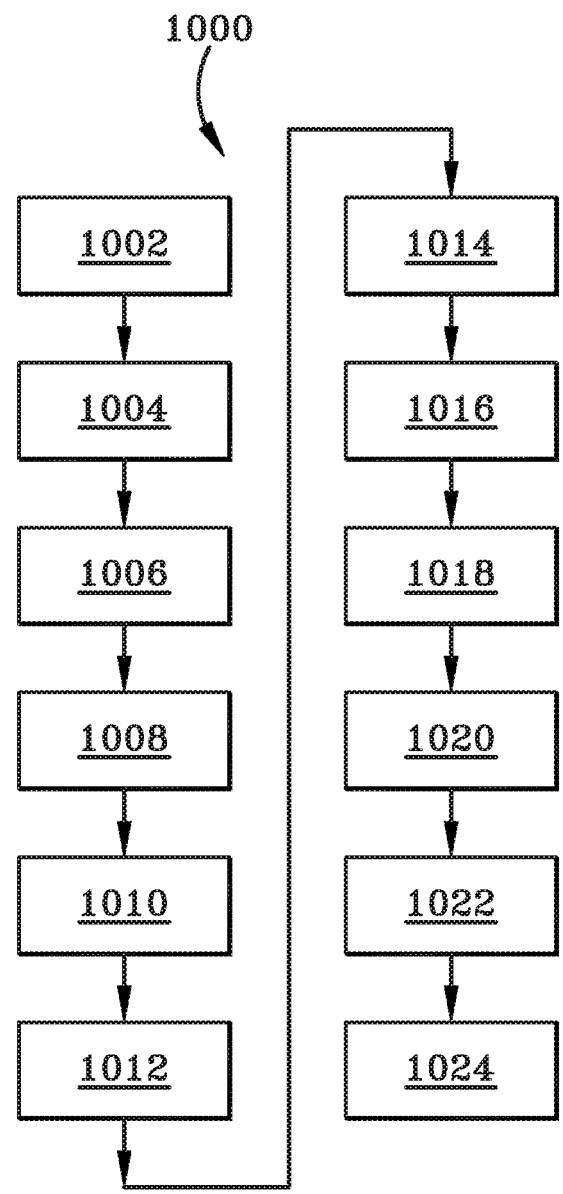
FIG.9
FIG.10

SEARCH AND PROTECT DEVICE FOR AIRBORNE TARGETS

TECHNICAL FIELD

This present disclosure relates to a search and protect device. Particularly, the disclosure is directed to a search and protect device for airborne threats of interest within a 360-degree field of view. Specifically, the disclosure relates to a search and protect device that can autonomously determine threats and engage such threats with appropriate countermeasures.

BACKGROUND

Background Information

The Sensor Fuzed Weapon (SFW) is an air-to-ground munition designed to meet the Air Force requirement for a general-purpose weapon that provides multiple kills per pass; can be employed over a wide area; functions under adverse weather conditions, at night, in an electronic countermeasures environment; and can be deployed from frontline fighters and bombers. Some such devices are a sensor fuzed warhead comprised of an infrared sensor, a safe and arming device, a thermal battery, and a copper liner. The SFW is operative to engage an infrared sensor which detects the target and fuzes the warhead to explosively form the copper liner into a kinetic energy projectile that can defeat both armored and soft vehicle targets.

However, as a limitation, the SFW was not maneuverable with respect to its flight path. Another variant for SFW, Damocles, had a similar mission, except that it was flown via a parafoil and was designed to operate in all-weather with finding and defeating any targets that were camouflaged or else hidden by fog. By modern standards, this is essentially a "gliding" UAV (unmanned aerial vehicle or drone) with extensive sophisticated onboard electronics. A modern attack drone is likely to be disposable, this represents a lower cost UAV as it does not have a propulsion cost, at the expense of range and ease of launch. This deployment was a maneuverable version of an SFW concept.

There was also a ground based version of SFW which also made full-scale production. It was called WAM (Wide Area Munition). The WAM was developed for defending against track and other wheeled ground vehicles. One such device was a small lightweight platform which may be dropped from a vehicle or from the air, which permits deployment in virtually any place, including flat or sloped surfaces. The WAM may then be activated manually to permit personnel to move from the area prior to arming or may be immediately activated by remote control.

When seismic and acoustic sensors in the WAM are activated after its deployment, ground and environmental conditions are monitored in order to detect and classify tracked and wheeled military vehicles. Upon detection of a target vehicle, a WAM tracks the target vehicle and launches a sensor fuzed sublet over the target vehicle. An infrared sensor on the sublet detects the target vehicle and initiates an explosively formed penetrator warhead to defeat the top vehicle armor.

What is needed is a mechanism to protect a target against threats and be able to operate in hostile environments to detect such threats and launch appropriate countermeasures.

SUMMARY

As such, SFW weapons may benefit from improvement in the ability to address airborne targets as well as fast moving targets. Targets as used herein refer to the vehicles, whether ground based or airborne that are to be protected by the search and protect device.

In one aspect, an exemplary embodiment of the present disclosure may provide a search and protect device comprising: a rotating rangefinder including: a first transmitter transmitting energy in a pattern about a first angle, said first transmitter operatively coupled to a first receiver; a second transmitter transmitting energy in a pattern about a second angle, said second transmitter operatively coupled to a second receiver; at least one third transmitter transmitting energy in a pattern about at least one third angle, said at least one third transmitter operatively coupled to at least one third receiver, said first, second and at least one third transmitter constituting a transmitter array and are electrically coupled to a processor operative to read signals from the transmitter array to determine if an object is a potential threat or an actual threat engage the potential threat; and at least one alternative effector on each transmitter array operative to be deployed to the potential threat object which passes through the energy transmitted by the first, second and at least one third transmitter in succession and is thereby reflected off of the potential threat object and the energy is thereby received by the first, second and at least one third receiver, said reflections operative to deem the potential threat as the actual threat. This exemplary embodiment or another exemplary embodiment may further provide for a plurality of transmitter arrays, each electrically coupled to itself and to the processor. This exemplary embodiment or another exemplary embodiment may further provide for an IR camera operative to use image recognition to look at potential threats to deem them actual threats to the processor, independent of other indicia. This exemplary embodiment or another exemplary embodiment may further provide for the pattern of the energies of the first, second, and at least one third transmitters are conical shaped. This exemplary embodiment or another exemplary embodiment may further provide for the rotating rangefinder is mounted to an unmanned craft. This exemplary embodiment or another exemplary embodiment may further provide for the rotating rangefinder is mounted to an outer wall of a building. This exemplary embodiment or another exemplary embodiment may further provide for a plurality of rangefinder arrays. This exemplary embodiment or another exemplary embodiment may further provide for four rangefinder arrays. This exemplary embodiment or another exemplary embodiment may further provide for the transmitter array in a line with one another, disposed at different angles. This exemplary embodiment or another exemplary embodiment may further provide for the transmitter is disposed at adjustable angles. Such a device could also be on a ground based platform, or else attached to a mobile vehicle.

In another aspect, an exemplary embodiment of the present disclosure may provide a method of eliminating a threat comprising: transmitting energy from a transmitter array; receiving portions of energy back from the transmitted energy by a plurality of receivers corresponding to a potential threat; deeming the potential threat an actual threat; and deploying countermeasures in response to the actual threat. This exemplary embodiment or another exemplary embodiment may further provide for the transmitter array to comprise: a first transmitter transmitting energy in a pattern about a first angle, said first transmitter operatively coupled to a first receiver; a second transmitter transmitting energy in a pattern about a second angle, said second transmitter operatively coupled to a second receiver; at least one third transmitter transmitting energy in a pattern about at least one third angle, said at least one third transmitter operatively coupled to at least one third receiver, said first, second and at least one third transmitter constituting a transmitter array and are electrically coupled to a processor operative to read signals from the transmitter array to determine if an object is a potential threat or an actual threat engage the potential threat. This exemplary embodiment or another exemplary embodiment may further provide for prior to deeming the potential threat an actual threat, calculating a velocity and trajectory of the potential threat as a function of movement from the geospatial location of the potential threat. This exemplary embodiment or another exemplary embodiment may further provide for prior to transmitting energy mounting the transmitter array onto an unmanned vehicle. This exemplary embodiment or another exemplary embodiment may further provide for transmitting energy mounting the transmitter array onto an outer wall of a building. Such a device could also be on a ground based platform, or else attached to a mobile vehicle.

In yet another aspect, an exemplary embodiment of the present disclosure may provide a method of predicting location of a target comprising: transmitting a first energy from a first emitter, reflecting the first energy off of a projectile, receiving the reflected first energy in a first receiver, transmitting a second energy from a second emitter, reflecting the second energy off of the projectile, receiving the reflected second energy in a second receiver, computing a velocity of the projectile, transmitting a third energy from a third emitter, reflecting the third energy off of the projectile, computing the velocity of the projectile and confirming it to be similar to previous calculation, computing the angular bearing of the projectile, determining a future location of the projectile based on previous computations. This exemplary embodiment or another exemplary embodiment may further provide for firing a countermeasure at the determined future location of the projectile. This exemplary embodiment or another exemplary embodiment may further provide for transmitting energy from the third emitter determining if the projectile is a threat based on the velocity of the projectile. This exemplary embodiment or another exemplary embodiment may further provide for after determining, disengaging if the velocity of the projectile is determined to not be that of a threat. This exemplary embodiment or another exemplary embodiment may further provide for engaging the projectile with a countermeasure if the projectile is determined to be a threat.

In yet another aspect, an exemplary embodiment of the present disclosure may provide for a search and protect device comprising: a rangefinder including: a first transmitter transmitting energy in a pattern about a first angle, said first transmitter operatively coupled to a first receiver, a second transmitter transmitting energy in a pattern about a second angle, said second transmitter operatively coupled to a second receiver, and at least one third transmitter transmitting energy in a pattern about at least one third angle, said at least one third transmitter operatively coupled to at least one third receiver, said first, second and at least one third transmitter constituting a transmitter array and are electrically coupled to a processor operative to read signals from the transmitter array to determine if an object is a potential threat or an actual threat, and at least one alternative effector on the transmitter array operative to be deployed to the potential threat object which passes through the energy transmitted by the first, second and at least one third transmitter in succession and is thereby reflected off of the potential threat object and the energy is thereby received by the first, second and at least one third receiver, said reflections operative to deem the potential threat as the actual threat and deploy the at least one alternate effector. This exemplary embodiment or another exemplary embodiment may further provide for a plurality of transmitter arrays, each transmitter array electrically coupled to the other transmitter arrays and to the processor.

This exemplary embodiment or another exemplary embodiment may further provide for an electromagnetic radiation detector operative to use image recognition to look at potential threats to deem them actual threats to the processor, independent of other indicia. This exemplary embodiment or another exemplary embodiment may further provide for the pattern of the energies of the first, second, and at least one third transmitters are conical shaped. This exemplary embodiment or another exemplary embodiment may further provide for the rangefinder is mounted to an unmanned craft. This exemplary embodiment or another exemplary embodiment may further provide for the rangefinder is mounted to an outer wall of a building. This exemplary embodiment or another exemplary embodiment may further provide for a plurality of rangefinder arrays. This exemplary embodiment or another exemplary embodiment may further provide for four rangefinder arrays. This exemplary embodiment or another exemplary embodiment may further provide that rangefinder is operative to rotate. This exemplary embodiment or another exemplary embodiment may further provide for the transmitter array is in a line with one another, disposed at different angles. This exemplary embodiment or another exemplary embodiment may further provide for the transmitter to be disposed at adjustable angles.

In yet another aspect, an exemplary embodiment of the present disclosure may provide a method of eliminating a threat comprising: transmitting energy from a transmitter array, wherein the transmitter array comprises: a first transmitter transmitting energy in a pattern about a first angle, said first transmitter operatively coupled to a first receiver; a second transmitter transmitting energy in a pattern about a second angle, said second transmitter operatively coupled to a second receiver; and at least one third transmitter transmitting energy in a pattern about at least one third angle, said at least one third transmitter operatively coupled to at least one third receiver, said first, second and at least one third transmitter constituting a transmitter array and are electrically coupled to a processor operative to read signals from the transmitter array to determine if an object is a potential threat or an actual threat, receiving portions of energy back from the transmitted energy by a plurality of receivers corresponding to a potential threat, determining that the potential threat an actual threat, and deploying countermeasures in response to the actual threat. This exemplary embodiment or another exemplary embodiment may further provide prior to determining the potential threat an actual threat, calculating a velocity and trajectory of the potential threat as a function of movement from a geospatial location of the potential threat. This exemplary embodiment or another exemplary embodiment may further provide for prior to transmitting energy mounting the transmitter array onto an unmanned vehicle. This exemplary embodiment or another exemplary embodiment may further provide for prior to transmitting energy mounting the transmitter array onto an outer wall of a building.

In yet another aspect, an exemplary embodiment of the present disclosure may provide a method of predicting location of a target comprising: transmitting a first energy from a first emitter, reflecting the first energy off of a projectile, receiving the reflected first energy in a first receiver, transmitting a second energy from a second emitter, reflecting the second energy off of the projectile, receiving the reflected second energy in a second receiver, computing a velocity of the projectile, transmitting a third energy from a third emitter, reflecting the third energy off of the projectile, computing the velocity of the projectile and confirming it to be similar to previous calculation, computing the angular bearing of the projectile, and determining a future location of the projectile based on previous computations. This exemplary embodiment or another exemplary embodiment may further provide firing a countermeasure at the determined future location of the projectile. This exemplary embodiment or another exemplary embodiment may further provide for prior to transmitting energy from the third emitter: determining if the projectile is a threat based on the velocity of the projectile. This exemplary embodiment or another exemplary embodiment may further provide for after determining, disengaging if the velocity of the projectile is determined to not be that of a threat. This exemplary embodiment or another exemplary embodiment may further provide for engaging the projectile with a countermeasure if the projectile is determined to be a threat.

In yet another aspect, an exemplary embodiment of the present disclosure may provide a method of predicting location of a target comprising: transmitting a first energy from a first emitter, receiving reflected first energy reflected from a projectile in a first receiver, transmitting a second energy from a second emitter, receiving reflected second energy reflected from the projectile in a second receiver, computing a first velocity of the projectile, transmitting a third energy from a third emitter, receiving reflected third energy reflected from the projectile in a third receiver, computing a second velocity of the projectile and confirming it to be similar to the first velocity, computing the angular bearing of the projectile, and determining a future location of the projectile based on the first, second velocity and angular bearing. This exemplary embodiment or another exemplary embodiment may further provide for prior to transmitting energy from the third emitter: determining if the projectile is a threat based on the velocity of the projectile. This exemplary embodiment or another exemplary embodiment may further provide for after determining, disengaging if the velocity of the projectile is determined to not be that of a threat. This exemplary embodiment or another exemplary embodiment may further provide for engaging the projectile with a countermeasure if the projectile is determined to be a threat.

BRIEF DESCRIPTION OF THE SEVERAL VIEWS OF THE DRAWINGS

Sample embodiments of the present disclosure are set forth in the following description, are shown in the drawings and are particularly and distinctly pointed out and set forth in the appended claims.

FIG. 9 is a flowchart describing an exemplary method for use of the device.

FIG. 10 is a flowchart describing an alternative exemplary method for use of the device.

Similar numbers refer to similar parts throughout the drawings.

DETAILED DESCRIPTION

A new device and method of operation thereof is depicted in the present disclosure and throughout FIGS. 1-10. Device 10 is a new and improved apparatus that may be used to eliminate high velocity projectiles prior to coming into contact or otherwise near, adjacent or proximate with whatever the device may be mounted to a protected target, as will be discussed hereafter.

Figure 1:
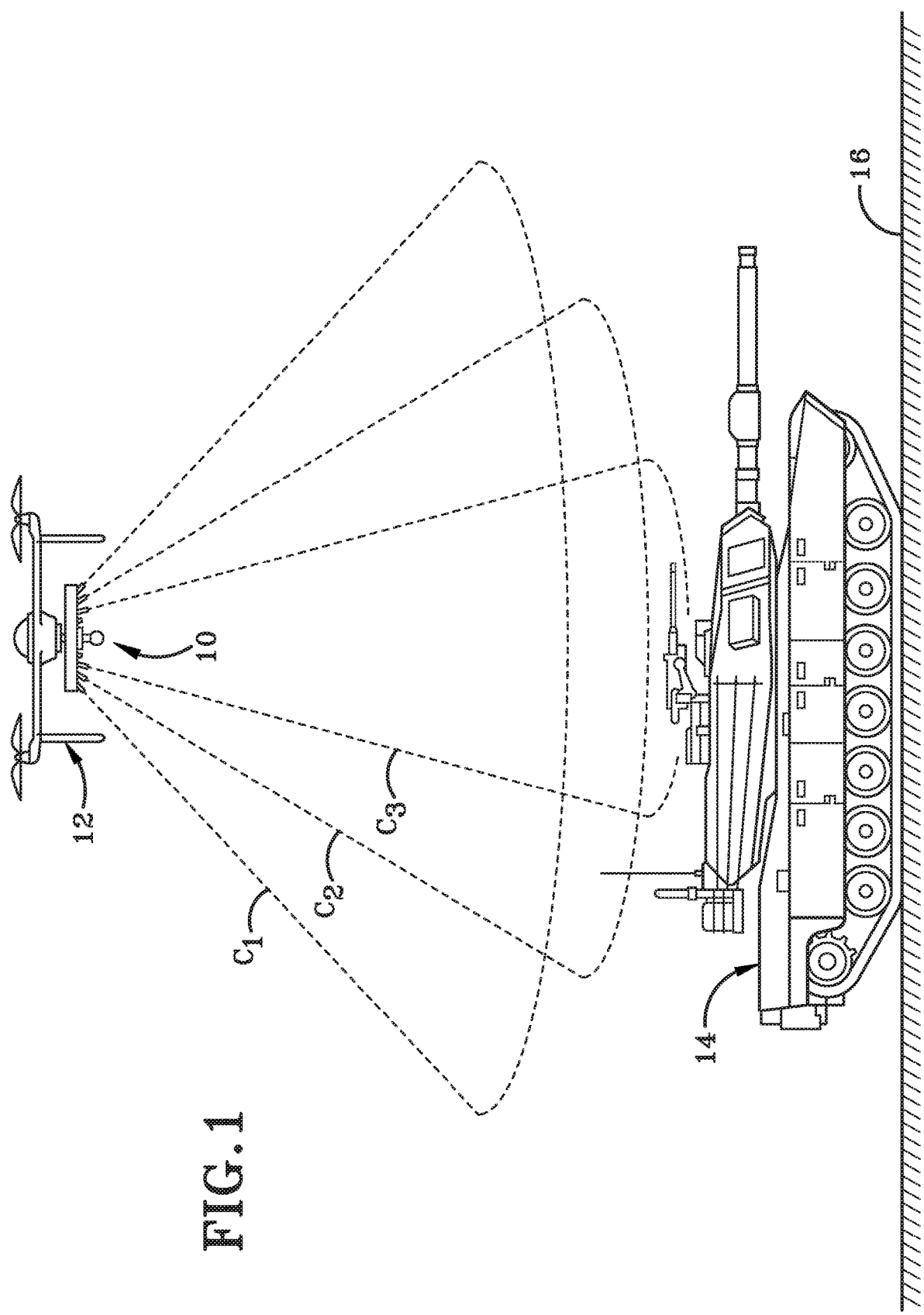
FIG. 1 is a diagrammatic elevation view showing a device in accordance with an aspect of the present disclosure in operation above an exemplary tank.

Referring to FIG. 1, there is shown an exemplary device 10 which is coupled or attached to an Unmanned Aerial Vehicle (UAV) 12 above a tank 14 on a surface 16. The device 10 has a series of concentric range sensing devices, as will be discussed later. These range sensing devices are represented by their radiation or energy probing through the air within their respective conic sections, $C_1$, $C_2$, $C_3$.

While a UAV 12 is shown for the purpose of discussion, the device 10 could be suspended on any movable platform including but not limited to a helicopter, aircraft, balloon or satellite. Likewise, the device 10 need not be attached to an unmanned vehicle 12 and may just as easily be attached to a manned device.

As will be explained in detail later, the device 10 has at least three range sensing devices coupled to a countermeasure or an alternative effector designed to eliminate or neutralize incoming projectiles deemed to be a threat.

Figure 2:
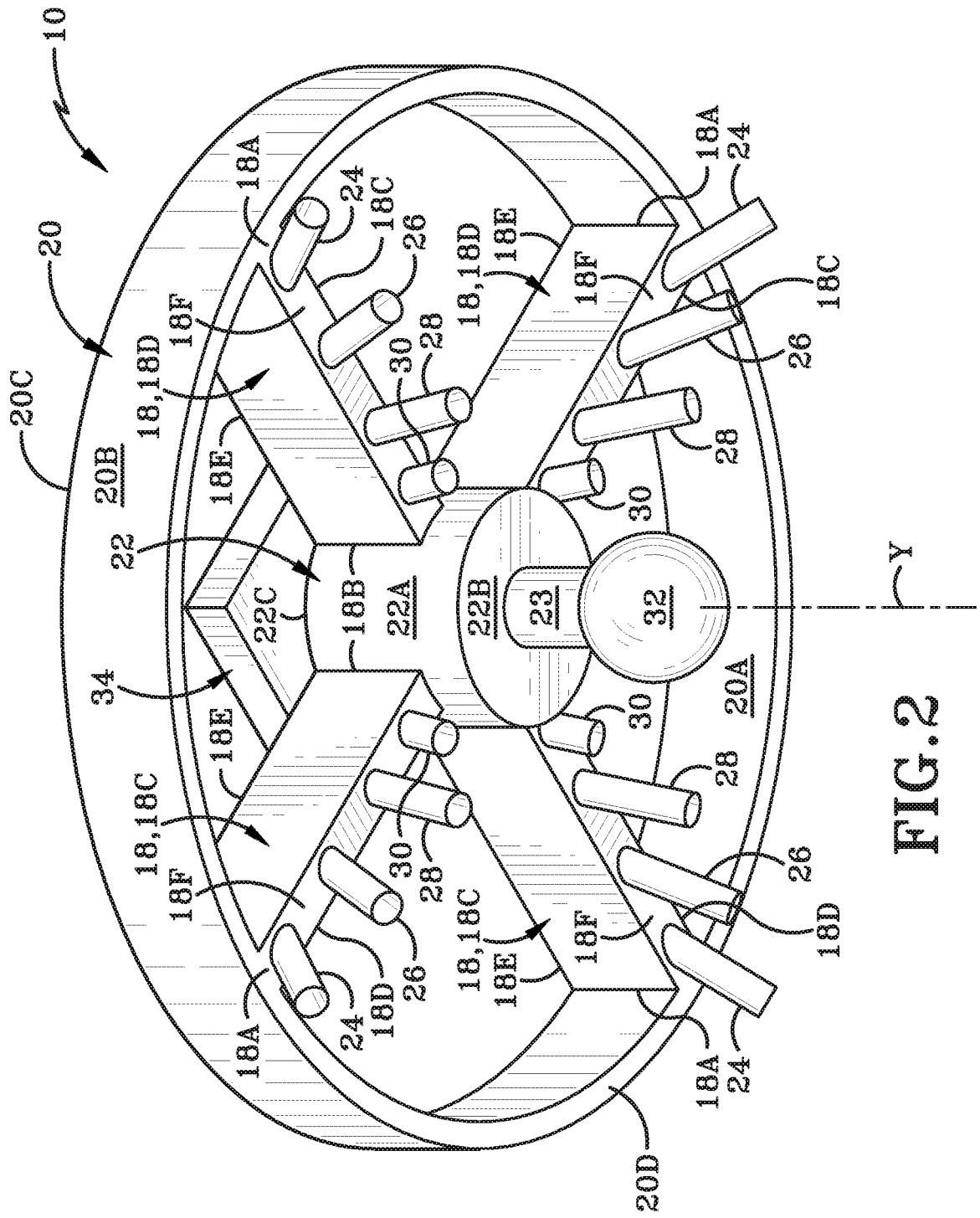
FIG. 2 is a perspective view of the exemplary device of FIG. 1 shown on its own.

Referring now to FIG. 2, there is shown an exemplary device 10 in a front perspective view. The device in an exemplary embodiment has four substantially identical fins 18, as such, all will be described the same. Each fin 18 has a front side 18A and back side 18B opposed to the front side 18A. The front side 18A is configured to be attached to an outer generally circular boundary piece 20 at its inner surface 20A. The circular boundary piece 20 extends circumferentially around the fins 18 by a central vertical axis Y. Circular boundary piece also has an outer surface 20B and surfaces latitudinal between them defining a top surface 20C and bottom surface 20D. The back side 18B is configured to be attached to a central portion 22. By this attachment, a first side 18C and second side 18D and are both substantially planar and form a rectangular shape there between the front side 18A and backside 18B. Stated otherwise, circular boundary piece 20 is an annular ring having parallel top and bottom ends with a cylindrical sidewall therebetween such that the circular boundary piece 20 is generally square or rectangular when viewed in cross-section.

The fins 18 further have a top side 18E and bottom side 18F longitudinally opposed to the first and second sides 18C, 18D. The top side 18E and bottom side 18F are both substantially planar and form a rectangular shape that spans the first side 18C and second side 18D. The exemplary device 10 is shown to have four fins, though one skilled in the art may understand this is merely an exemplary embodiment and multiple fin configurations including additional fins or as few as two.

In some embodiments the device 10 is configured to be constructed as a unibody, monolithic, single member formed from a unitary material, portions of the device will be described with references to other portions thereof and may be described with different references, but may be physically constructed from the same material and fabricated contemporaneously. For example, the device may be fabricated from a single casted material so as to define the structural relationships described herein. In alternative embodiments, there may be different materials to reduce weight, preserve structural integrity or other engineering design choices. The design can also be made using additive manufacturing technology as an integral structure.

The device 10 further comprises three electromagnetic range sensing devices including in an exemplary embodiment a first electromagnetic range sensing device 24, a second electromagnetic range sensing device 26 and a third electromagnetic range sensing device 28 located on the bottom surface 18F of the fin 18. The first electromagnetic range sensing device 24 is located radially outward relative to the central vertical axis Y when compared to the other two electromagnetic range sensing devices 26, 28, closest to the inside surface if the central portion 20A. The second electromagnetic range sensing device 26 is located between the first electromagnetic range sensing device 24 and the third electromagnetic range sensing device 28. The third electromagnetic range sensing device 28 is located nearest to the central portion 22 and back side of the fin 18B of all of the electromagnetic range sensing devices and radially inward from the other two electromagnetic range sensing devices 24, 26. While the exemplary embodiment shown in FIG. 2 is shown to have three electromagnetic range sensing devices 24, 26, 28, further embodiments could have any number of subcomponent devices.

The inner workings and further details regarding the angles of the electromagnetic range sensing devices will be discussed later with respect to FIGS. 3 and 4. As shown here in the exemplary embodiment, the device has three electromagnetic range sensing devices but in alternative embodiments may have as few as two and up to as many desired.

Further on the bottom surface 18F of the fin 18 is an alternate effector 30 or countermeasures used interchangeably herein. The alternate effector is located radially inwardly from the electromagnetic range sensing devices 24, 26, 28 closest back side 18B of the fin and the central portion 22. The set of electromagnetic range sensing devices 24, 26, 28 may be referred to as an array herein.

The alternate effector 30 may include, but is not limited to include a shaped charge, a net, a directed energy weapon such as microwave, sonic and laser, a shotgun type slug, a bullet, or other incendiary devices. The further details regarding the angles of the alternate effector will be discussed later with respect to FIGS. 3 and 4.

Additionally, as shown and described herein, in the exemplary embodiment the device has four alternate effectors 30, or one for each fin, but in alternative embodiments there may be as many per fin or as few per fin as desired. Design configurations relating to different materials to reduce weight, preserve structural integrity as well as payload composition may determine the ideal or optimal number of alternate effectors 30 to be implored.

The central portion 22 is generally cylindrical with an outside surface 22A where the back side 18B of the fin 18 make contact with the central portion. The central portion further has a bottom surface 22B with a cylindrical neck 23 with a housing at the bottom end of the cylindrical neck 32 containing an infrared cueing device or camera array 33 (as discussed later). Such an infrared cueing device or camera array 33 could also be a LIDAR array or any other laser or electromagnetic source or electromagnetic detector or combinations thereof.

Figure 3:
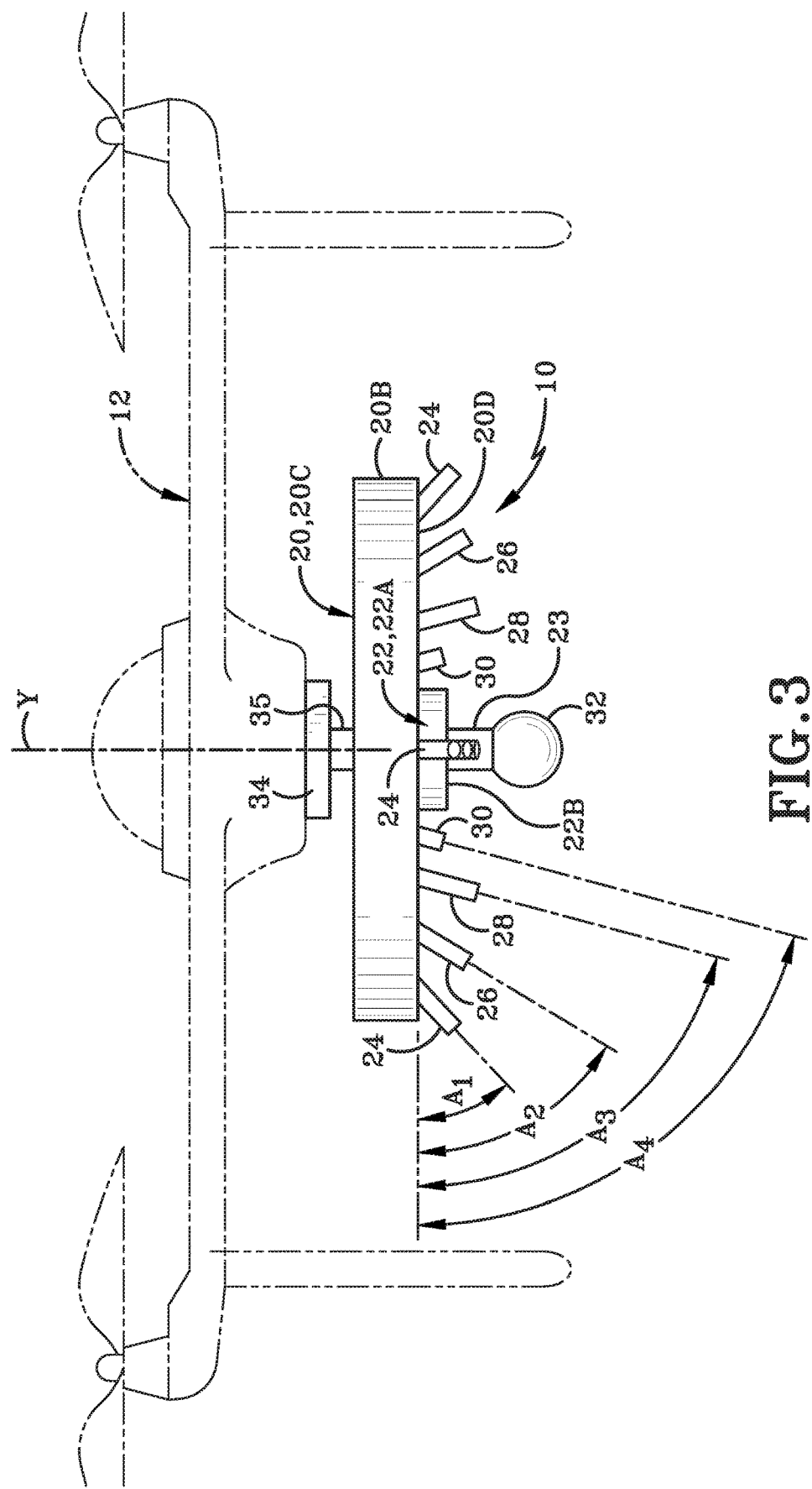
FIG. 3 is an elevation view of the exemplary device of FIG. 1 shown on its own.

Referring to FIG. 3, an elevation view of the exemplary device 10 is shown attached to a UAV 12 in phantom. This view depicts the angles of the electromagnetic range sensing devices 24, 26 and 28 along with the alternate effector 30. In the present embodiment they are placed at various angles, the first electromagnetic range sensing device 24 is placed at angle $A_1$, the second electromagnetic range sensing device 26 is placed at angle $A_2$, the third electromagnetic range sensing device 28 is placed at angle $A_3$, and the alternate effector placed at angle $A_4$.

These angles $A_1$, $A_2$, $A_3$, and $A_4$ generally will range from 0° to 90°, where 0° is pointing directly along the Y-axis and 90° is directly perpendicular to the Y-axis. More particularly the angles $A_1$, $A_2$, $A_3$, and $A_4$ will range from 10° to 80°. Specifically, the angles $A_1$, $A_2$, $A_3$, and $A_4$ will range from 20° to 70°. These angles may be adjustable, but all of the fins 18 will use the same angles, as will be discussed later with respect to the operation. As may be seen, in the FIG. 3, $A_1 \leq A_2 \leq A_3$. Stated otherwise, the electromagnetic range sensing device that is closest to the Y-axis (in the present embodiment 28) has the largest angle and the outermost electromagnetic range sensing device (in the present embodiment 24) has the smallest angle.

Additionally, the device 10 is operative to spin about the Y-axis. This rotation may be effectuated by a variable speed motor or servo 34. As such, the device may rotate at different rates depending on the ultimate application for the device 10 in the field by use of a drive shaft 35 or other such device to effectuate rotational motion.

Figure 4:
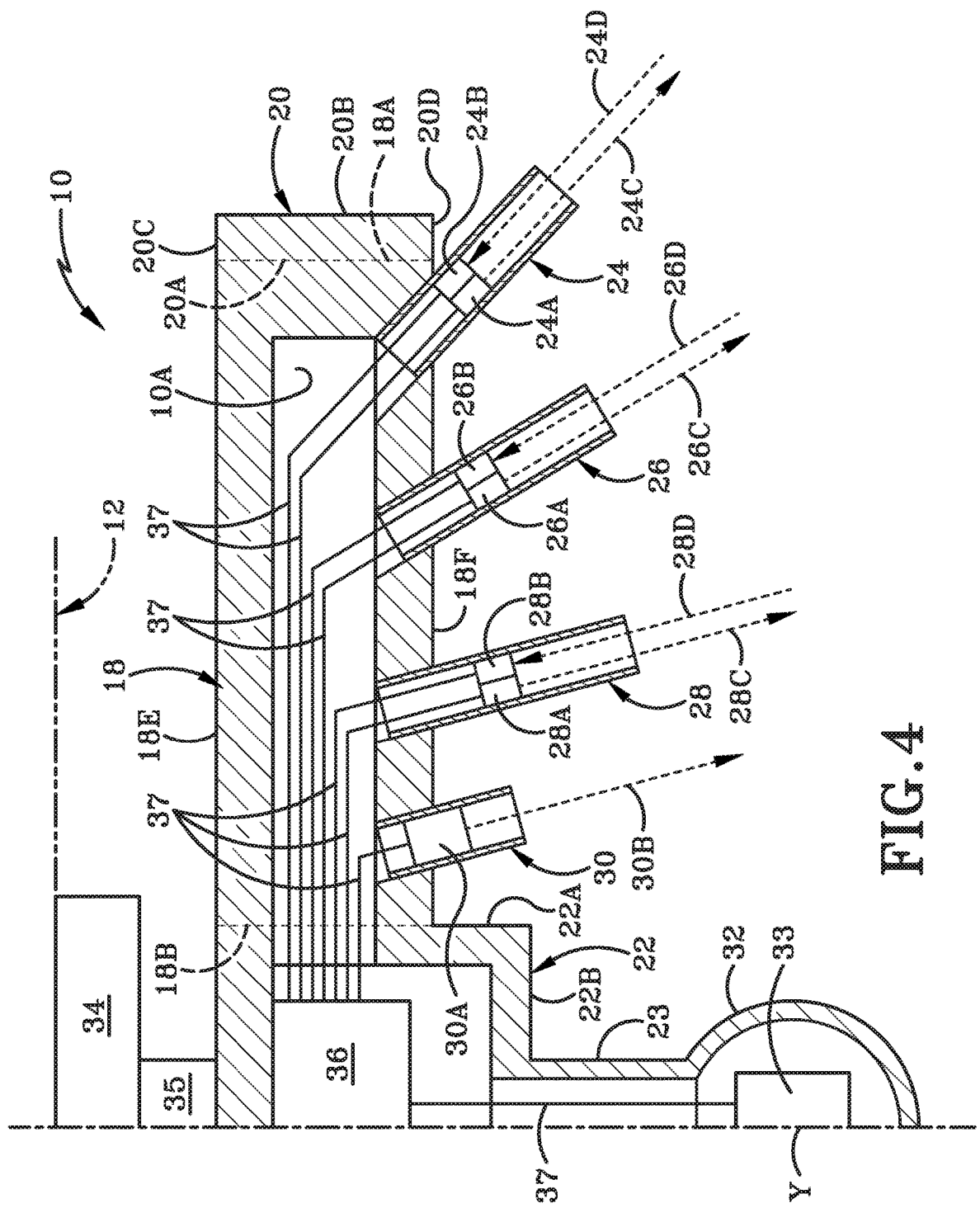
FIG. 4 is a front cross sectional view of a portion of the exemplary device.

Referring now to FIG. 4, a front cross sectional view of a portion of the exemplary device showing the internal components. In this view, an interior 10A of a single fin 18 is shown along with part of the central portion 22 and IR camera 33. Each electromagnetic range sensing device has its own emitter and receiver. The first electromagnetic range sensing device 24 has an emitter 24A and receiver 24B. The second electromagnetic range sensing device 26 has an emitter 26A and receiver 26B. The third electromagnetic range sensing device 28 has an emitter 28A and receiver 28B.

The emitters 24A, 26A, 28A are operative to emit energy or radiation 24C, 26C, 28C, respectively. In an exemplary embodiment, the emitters 24A, 26A, 28A emit a pulsed transmitted rangefinder energy beam in the direction of their respective angles. The emitters 24A, 26A, 28A and receivers 24B, 26B, 28B are all connected to a processor 36 by wires 37 or other connection means operative to control and analyze the signals. The receivers 24B, 26B, 28B that receive the reflected rangefinder beam 24D, 26D, 28D as reflected by a target projectile, ground, or nearby structures and is collected and converted to data that is analyzed by the on-board processor 36 to determine the distance with respect to objects under the path of the emitted radiation. Distance may be calculated based on the time-of-flight of the transmitted and received energy pulse. In exemplary embodiments, the size of the receivers 24B, 26B, 28B may be enlarged to allow for a greater time delay, or decrease in size to allow for less time delay, that may be associated with the emission energy 24C, 26C, 28C and reflected energy 24D, 26D, 28D. The processor 36 is also coupled to the alternate effector 30 and is operative to deploy and/or fire countermeasures 30A when deemed appropriate. The IR camera or cueing device 33 is also operatively linked to the processor 36 by wires 37 as well.

The countermeasures 30A may vary depending on the target being protected and the likely projectiles or other devices that may be used against the protected target. For example, if the device 10 is operative to protect a UAV 12, other similar flying platform, or a ground unit such as a tank 14 or other similarly positioned ground unit against devices that may contain chemical or other biological agents, it would not be wise to fire a shaped charge such as a shotgun-type slug or other bullet like projectile, as it may damage the payload of the other device and disperse its payload. As such, the counter measures 30A may include a net. The net is operative to deploy by a propellant. Suitable propellant may include a spring, compressed gas, an electro magnet or other such related devices to generate force. When the countermeasures 30A are initiated, the force generated by the propellant can push the net outward from the device 10 towards a target.

Further, in the instance of a UAV 12 as the protected target, they are also susceptible to cluster attacks, or multiple counter UAV devices or other such flying platforms being used to overwhelm the UAV 12. As such, the net may be a highly effective device as the net may envelop the propellers for small UAV devices, or weigh down the counter UAV such as it may not be able to fly.

In a further embodiment the countermeasures 30A may include an shaped charge projectile, a slug type projectile or an incendiary projectile. An exemplary incendiary projectile may be fired with a pin, fuze or other triggering device towards a target where it will collide with and penetrate the target. After colliding, with the target, the incendiary is then lit with a fuze and begins to expel gas from a closure from a rear opening using gas pressure developed by incendiary reacting within the projectile and then ejecting at least a portion of reacting incendiary from the casing through the rear opening using the same gas pressure from the incendiary reacting within the casing. The ejection is operative to disperse the ejected incendiary within the target.

A net and a fired projectile are merely two such devices that may be implored of the physical variety, that may be carried aboard as a type of ammunition. Other non-physical devices may have unlimited amounts, such as a laser or other sonic devices.

In such further embodiments the countermeasures 30A may include a laser or sonic device. The laser may have a power up to hundreds of megawatts per square centimeter. In further embodiments, the laser could be pulsed so as to provide a deep penetrating using a Gaussian beam. This type of laser beam could generate high heat below the surface of a target and may in certain instances provide an explosion beneath the surface of the target, thus, gaining a maximum destructive force from the laser beam. As such, in the laser embodiment, a payload would not be needed as the beam generator would be onboard and would not need replenished. Other devices have not been discussed in detail for the purposes of brevity, focus, clearness, and understanding of the claimed embodiments.

There may be a plurality of countermeasures 30A on board commiserate with the platform that is carrying the device 10. In instances where the platform is large, there may be a significant cache of countermeasures 30A. In instances where weight is paramount, there may be less countermeasures 30A on board. For example, when the device 10 is carried on a light weight UAV 12, there may be a desire to have less countermeasures 30A, such as those equal to the number of alternate effectors 30 on the device, whereas when the device 10 may be coupled to a building, an effective number could ultimately be infinite number, or readily reloadable when depleted.

There exists control and detection logic that has instructions on a storage medium. When said control and detection logic is executed by a processor 36, and is operative to control the spin and generation of the radiation beam 24C, 26C, 28C as well as the detection processing of the return beam 24D, 26D, 28D.

Figure 5A:
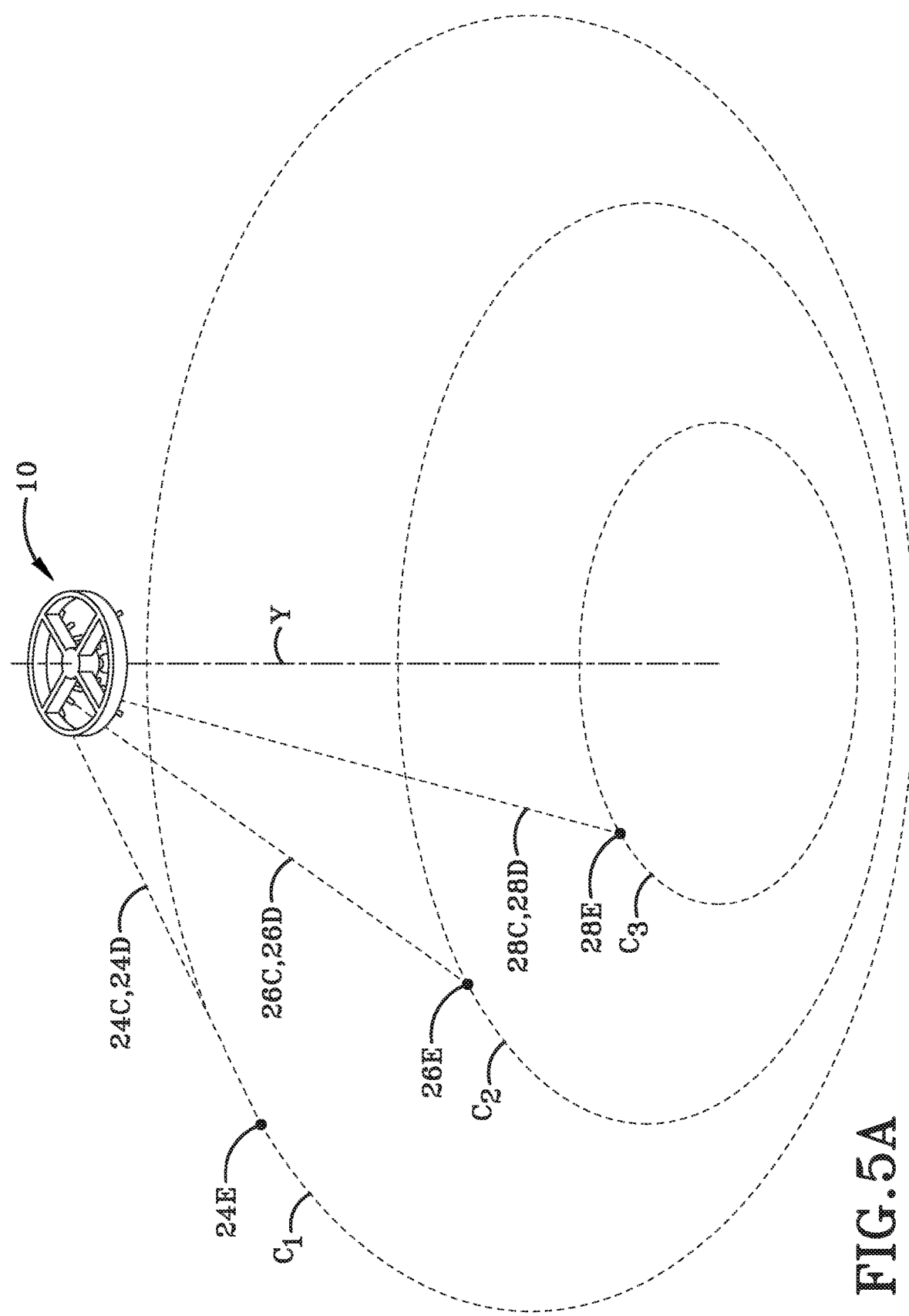
FIG. 5A is an operational perspective view showing the path of the rangefinders.
Figure 5B:
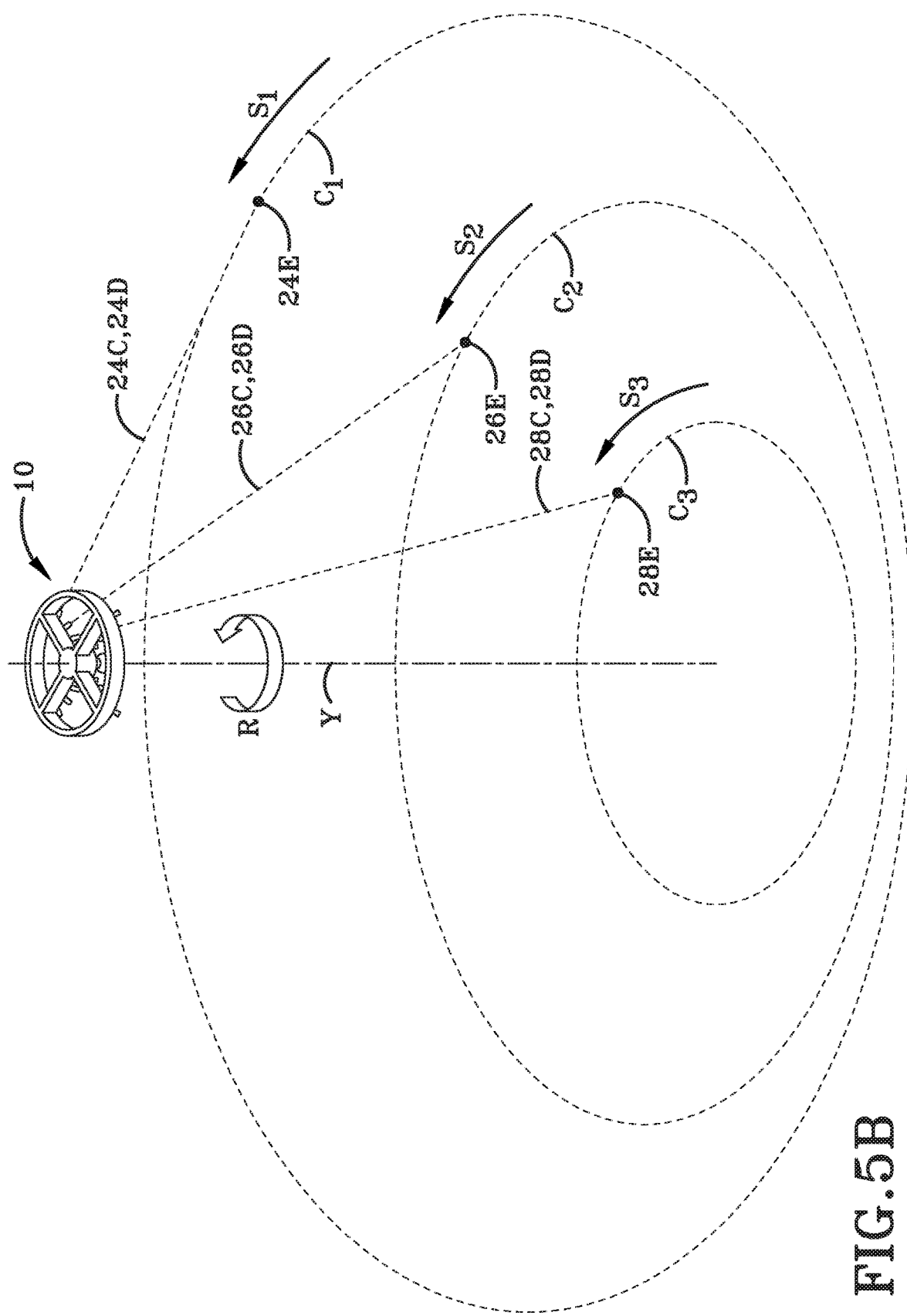
FIG. 5B is an operational perspective view showing the path of the rangefinders while in motion.
Figure 5C:
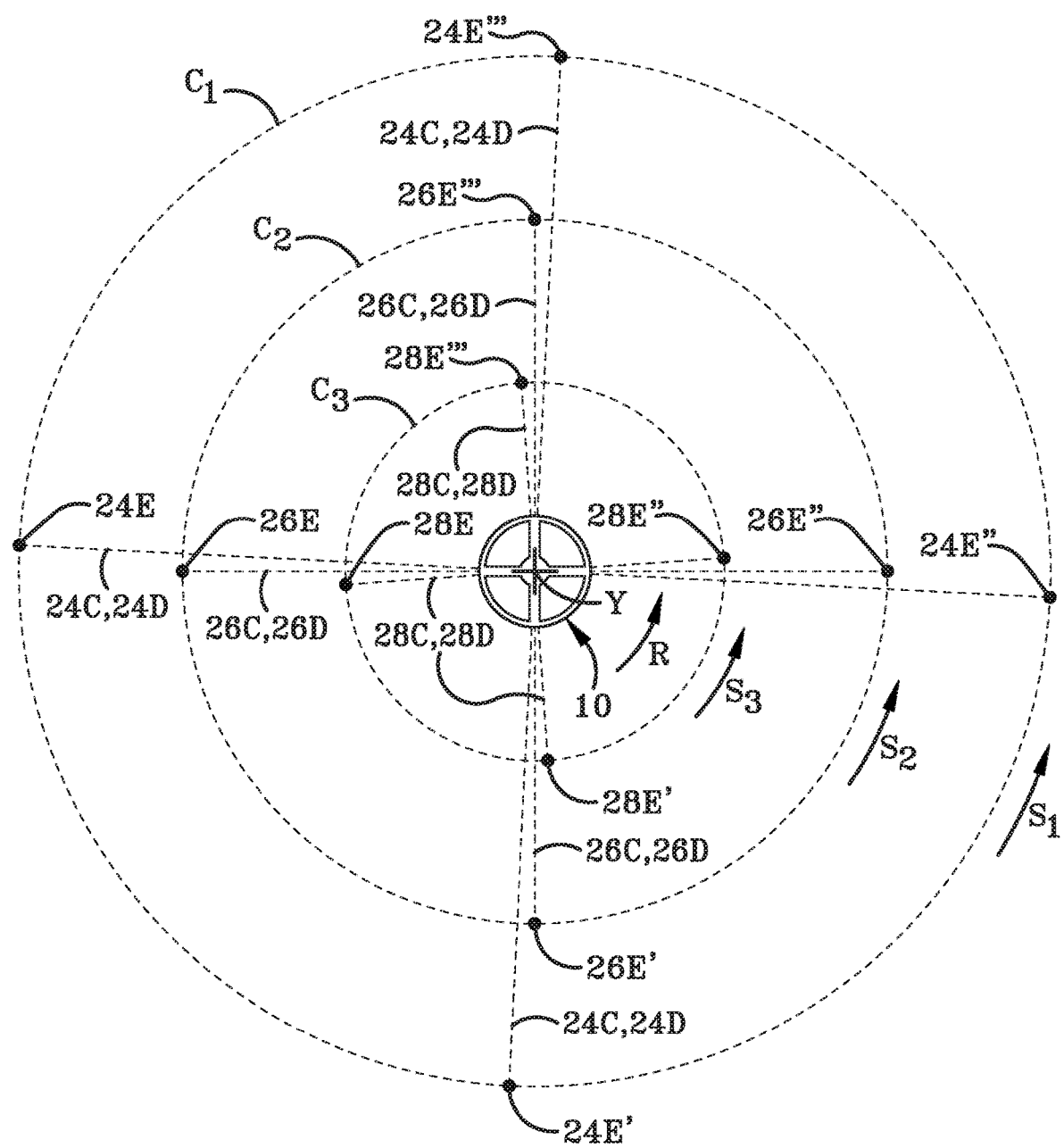
FIG. 5C is a top down perspective view showing the path of all of the exemplary range finders in motion.

Referring now to FIGS. 5A, 5B and 5C shows a top perspective view showing the path of the rangefinders and while in motion, respectfully. As can be seen, the beam paths 24C, 24D, 26C, 26D, 28C, 28D are traced in a circular manner to form a cone shaped path. The beam 24C traces an outer circle $C_1$, the beam 26C traces a middle circle $C_2$, and the beam 28C trades an inner circle $C_3$.

Each beam has a limiting distance based on the power of the electromagnetic range sensing devices 24, 26, 28. This point may be in the air or ground, depending on the positioning of the device 10. In the figure it is illustrated as a point 24E, 26E, 28E.

The device is operative to rotate in a first direction illustrated by the arrow "R" in FIG. 5B. As the device rotates, the point in which the electromagnetic range sensing devices 24, 26, 28 rotate along with the device 10 in a sweeping motion. The sweeping motion is depicted by arrows, $S_1$, $S_2$, and $S_3$.

The present embodiment indicates that the rotation of the device 10 and subsequently the electromagnetic range sensing devices 24, 26, 28 occurs in a counter-clockwise manner. However, in alternative embodiments rotation of the device 10 and electromagnetic range sensing devices 24, 26, 28 may occur in either a clockwise or a counterclockwise direction with respect to the device 10.

Referring now to FIG. 5C, a top down elevation view of an exemplary device 10 is shown. As the device is rotating in a first direction R, about the Y-axis, the electromagnetic range sensing devices 24, 26, 28 are deploying their beams 24C, 260, 28C. These beams are tracing their respective distances and range as 24E, 24E', 24E'', 24E''' for the first electromagnetic range sensing devices 24, 26E, 26E', 26E'', 26E''' for the second electromagnetic range sensing devices 26, and 28E, 28E', 28E'', 28E''' for the third electromagnetic range sensing devices 28.

Having now described the structure of the device and the various surfaces, components, and dimensions thereof, a method of use therefor will now be described.

Figure 6A:
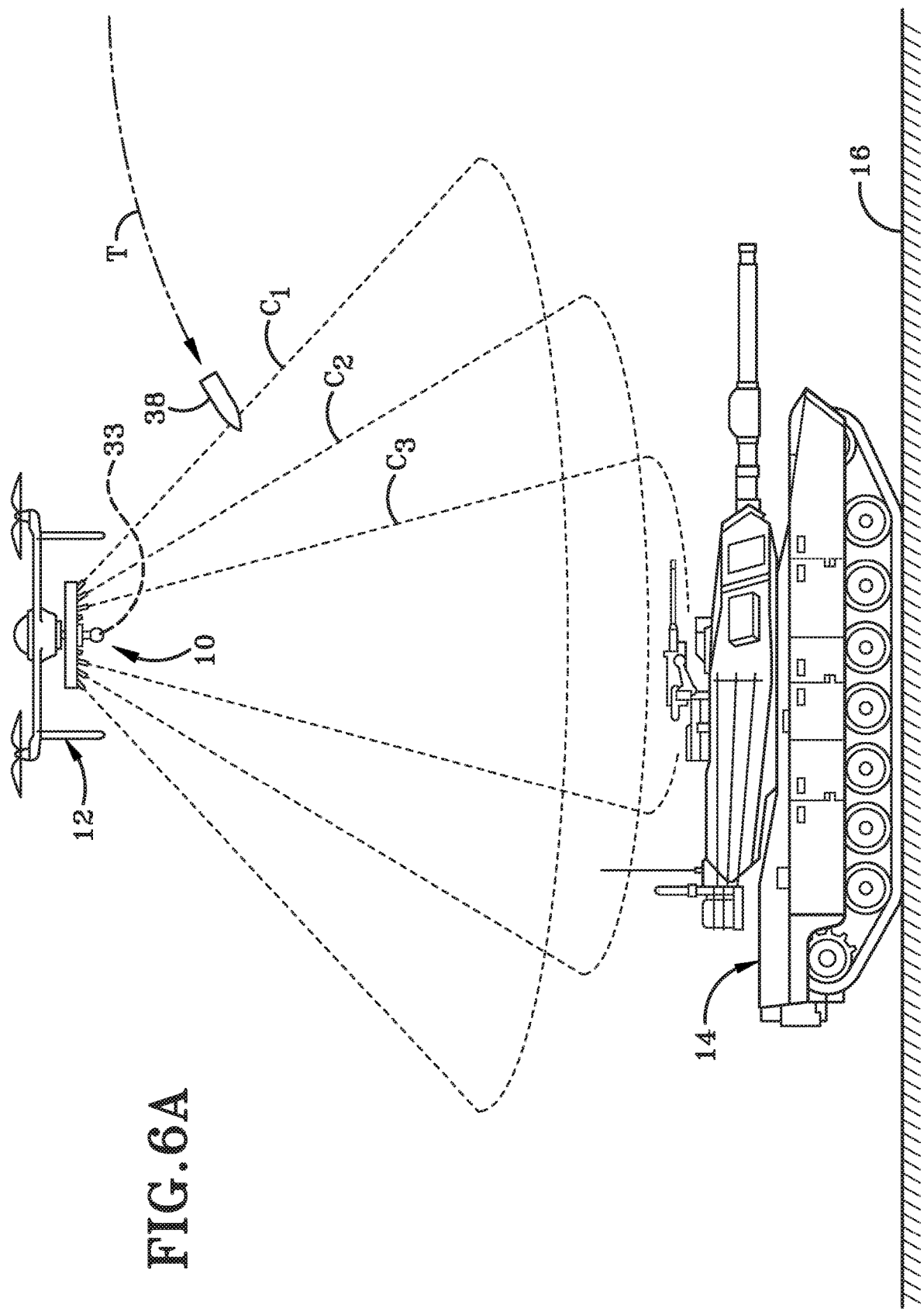
FIG. 6A is an operational diagrammatic elevation view of an exemplary device detecting a projectile in its first cone.

Referring now to FIG. 6A, FIG. 6B, FIG. 6C, and FIG. 6D as operational diagrammatic elevation views of an exemplary device 10 detecting a projectile 38 throughout flight is shown. Projectile 38 has a trajectory T. As seen in FIG. 6A, the projectile 38 first passes through the emitted energy 240 from the first electromagnetic range sensing device 24 emitter 24A. The emitted energy 24C is then reflected off of the projectile 38 where it becomes a reflected rangefinder beam 24D. The reflected rangefinder beam 24D returns to the first electromagnetic range sensing device 24 where it encounters the receiver 24B. The receiver 24B then transmits data to the processor 36 relating to the location of the projectile 38.

Figure 6B:
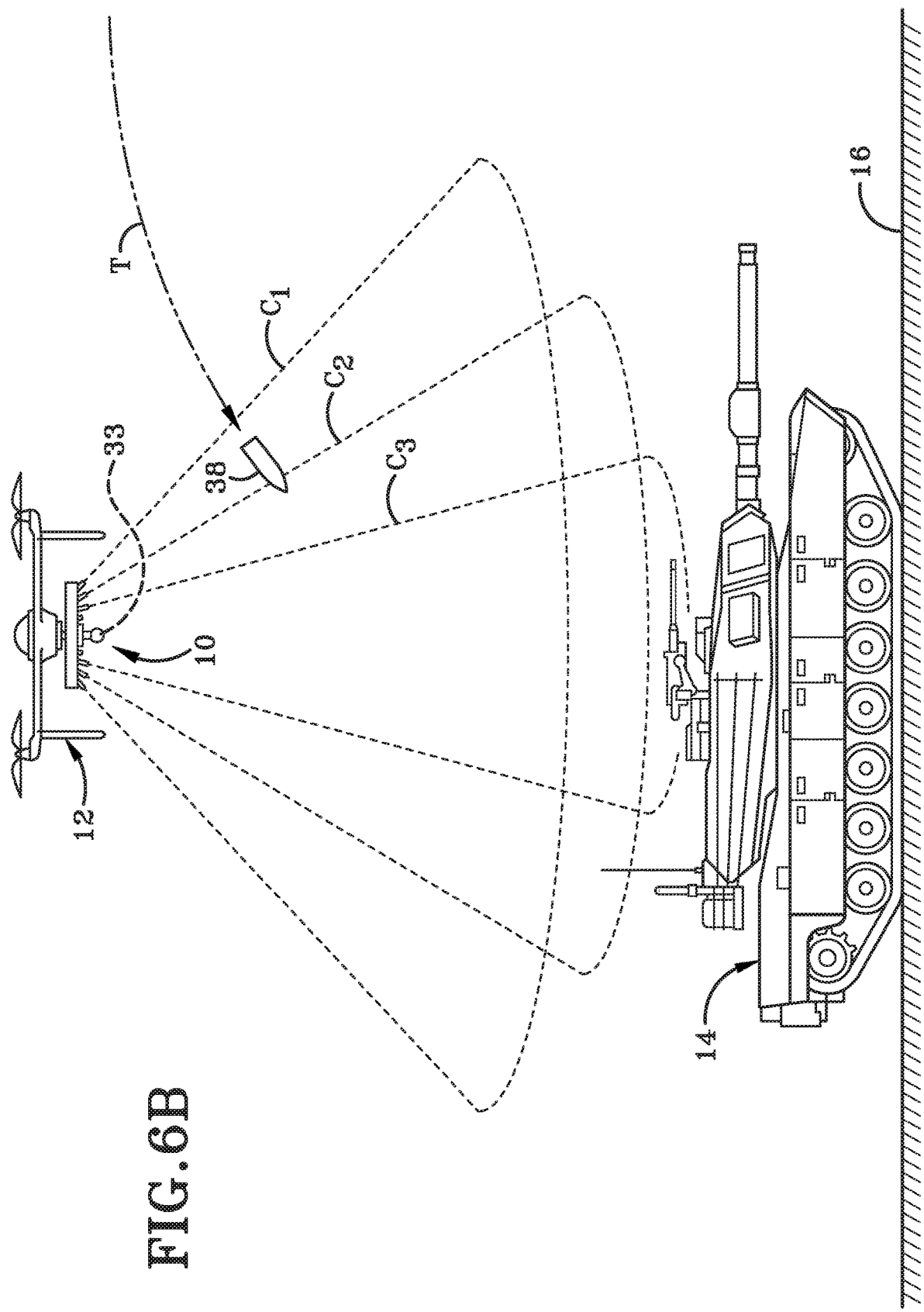
FIG. 6B is an operational diagrammatic elevation view of an exemplary device detecting a projectile in its second cone.

As seen in FIG. 6B, the projectile 38 subsequently passes through the emitted energy 26C from the second electromagnetic range sensing device 26 emitter 26A. The emitted energy 26C is then reflected off of the projectile 38 where it becomes a reflected rangefinder beam 26D. The reflected rangefinder beam 26D returns to the second electromagnetic range sensing device 26 where it encounters the receiver 26B. The receiver 26B then transmits data to the processor 36 relating to the location of the projectile 38. The processor 36 is then operative to determine the speed of the projectile 38 and is able to use set logic to determine if it may be deemed a threat based on its velocity.

Figure 6C:
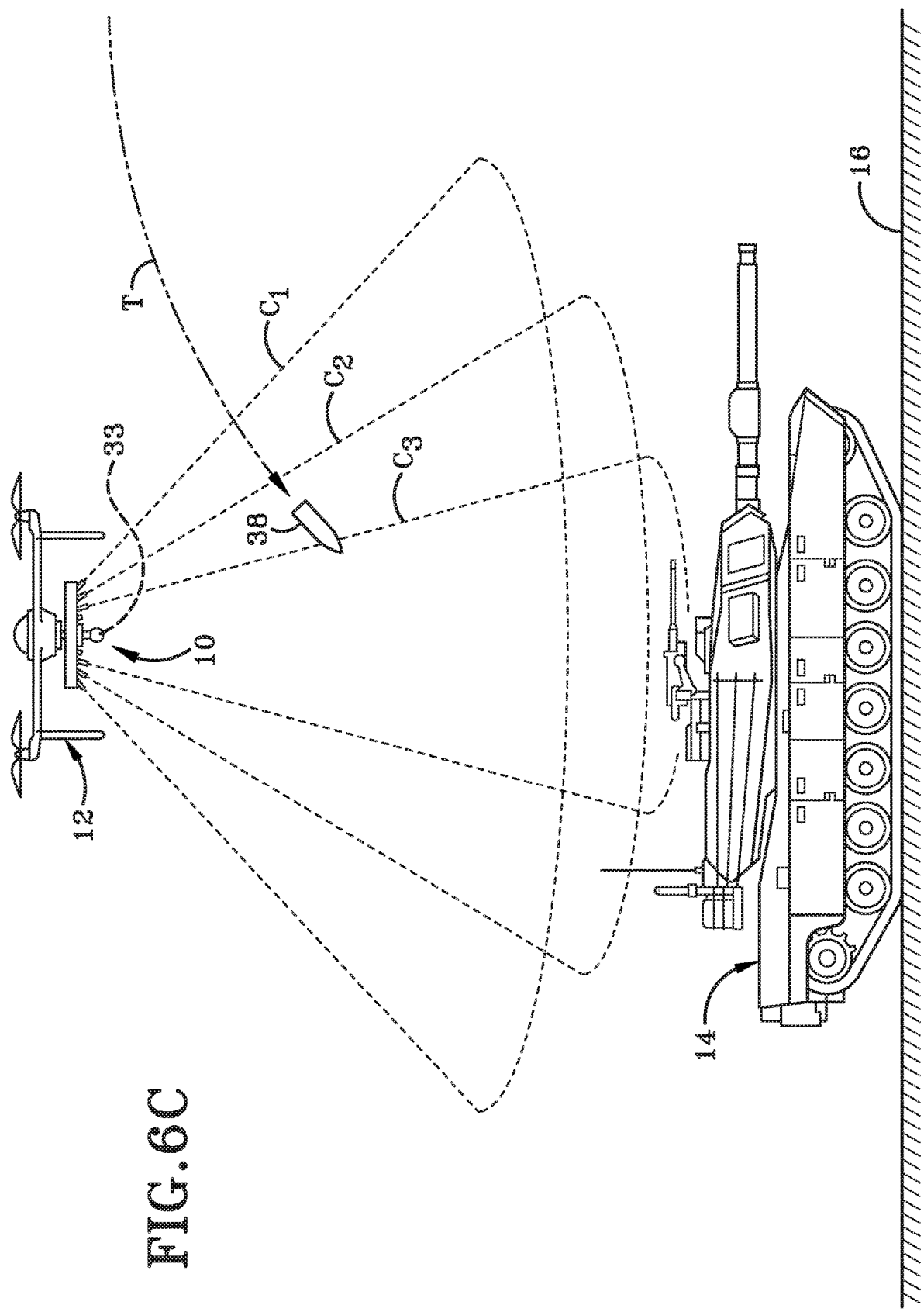
FIG. 6C is an operational diagrammatic elevation view of an exemplary device detecting a projectile in its third cone.
Figure 6D:
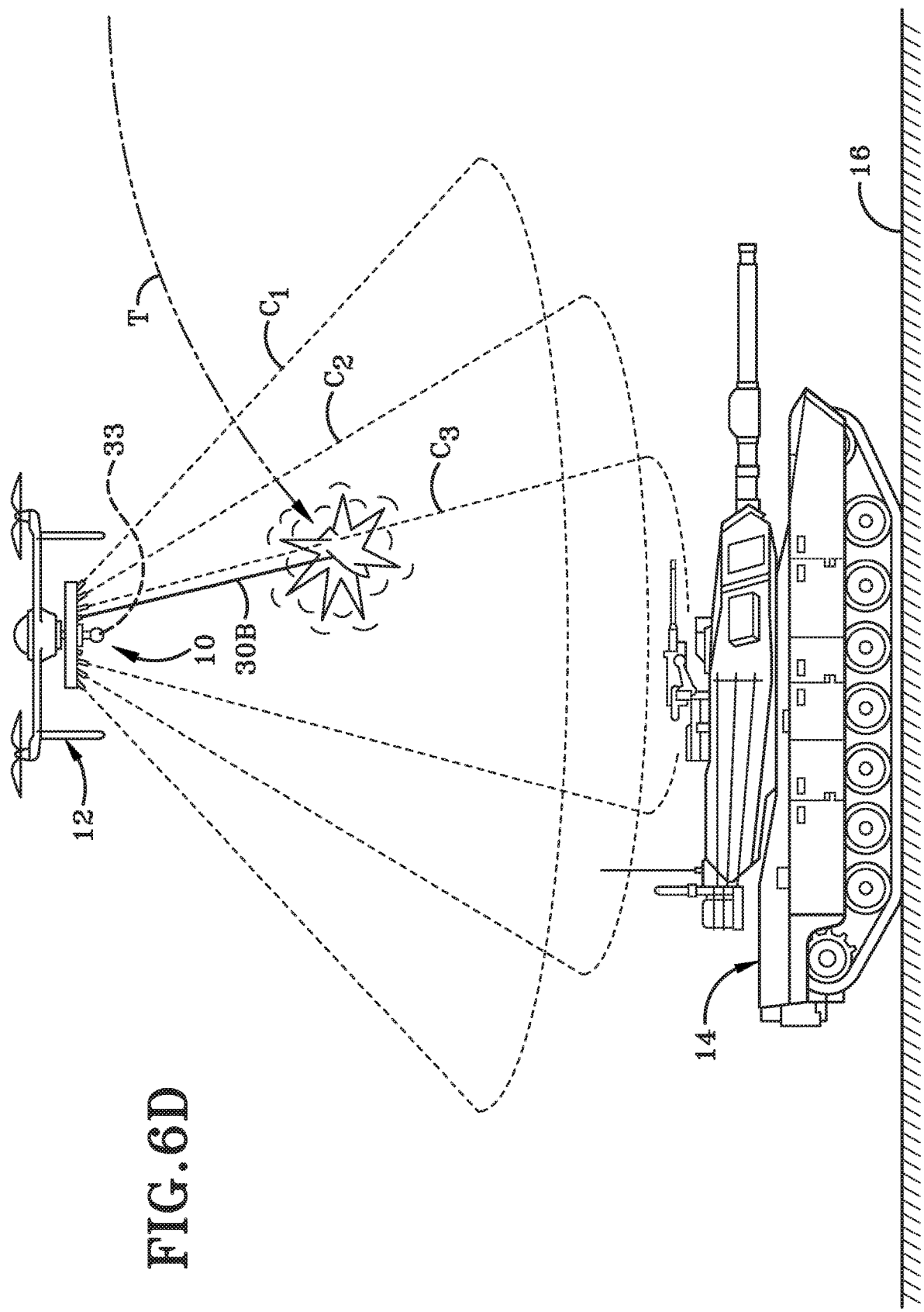
FIG. 6D is an operational diagrammatic elevation view of an exemplary device deploying countermeasures or an alternative effector to an inbound projectile deemed a threat.

As seen in FIG. 6C, the projectile 38 subsequently passes through the emitted energy 28C from the third electromagnetic range sensing device 28 emitter 28A, The emitted energy 28C is then reflected off of the projectile 38 where it becomes a reflected rangefinder beam 28D. The reflected rangefinder beam 28D returns to the third electromagnetic range sensing device 28 where it encounters the receiver 28B. The receiver 28B then transmits data to the processor 36 relating to the location of the projectile 38. The processor 36 is then operative to determine the speed of the projectile 38 and is able to use set logic to determine if it may still be deemed a threat based on the velocity of the projectile 38. At this juncture, the processor 36 has three data points and is able to predict both the future speed as well as the trajectory of the projectile 38. As such, as is shown in FIG. 6D, the projectile 38 has been eliminated through the use of the alternate effector or countermeasures 30A and fired as an exemplary beam or counter-measure path 30B based on the calculations of the processor. The processor 36 in a further embodiment can further determine the approximate location where the projectile 38 will strike and notify the vehicle 14 to take appropriate action such as changing location or enacting other countermeasures.

Figure 7:
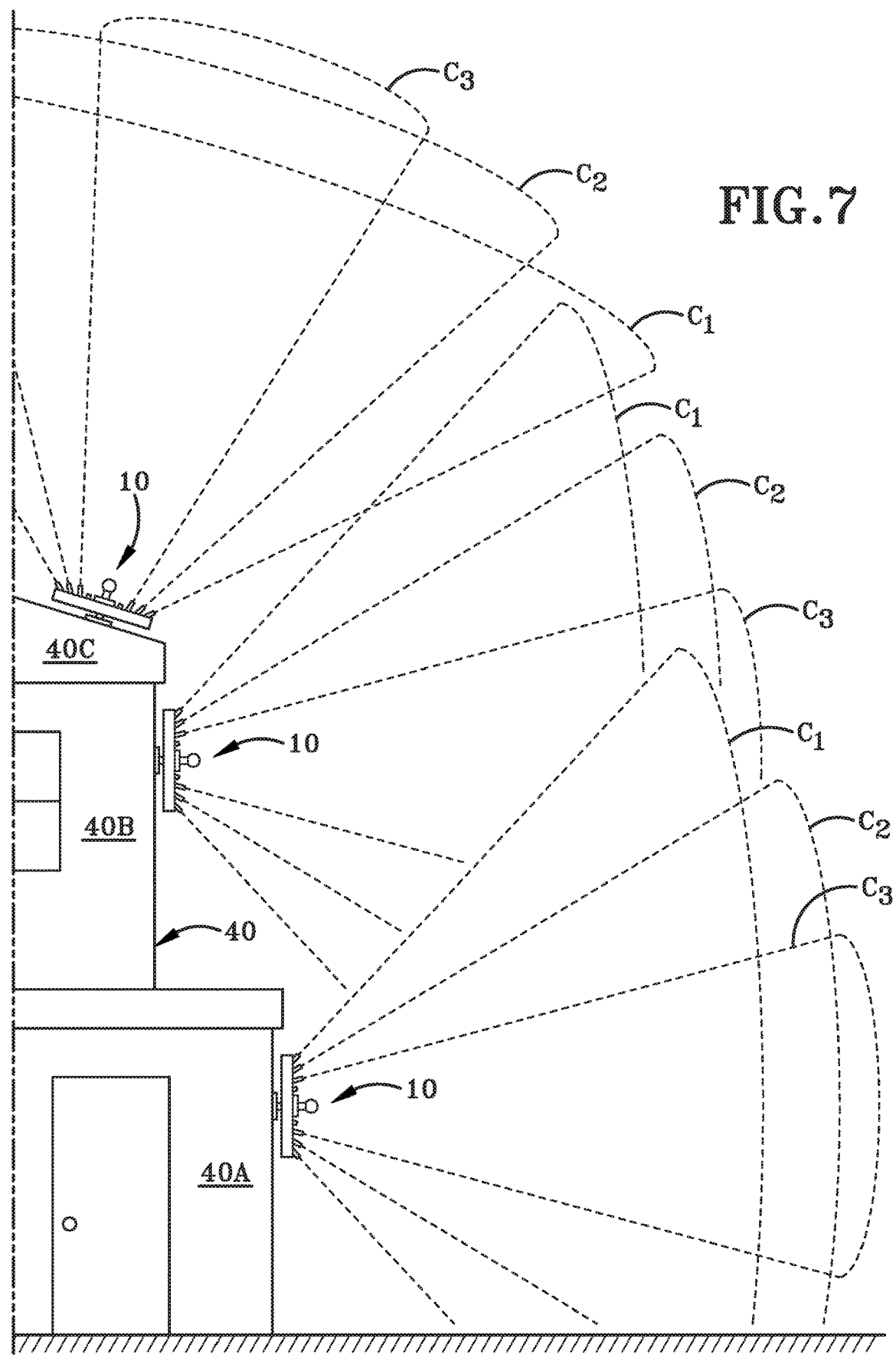
FIG. 7 is a diagrammatic view of a set of exemplary devices protecting a building.

As seen in FIG. 7, an elevation view of a set of exemplary devices 10 protecting a building 40. Devices 10 are attached to a lower side first story 40A, upper side second story 40B and the top of the building 40C. The devices 10 are strategically deployed so as to protect the entirety of the building 40.

As can be further seen, the paths of the array of devices 10 is able to protect the building 40 in its entirety. The devices 10 are operative to spin similar to previous embodiments and are able to detect any projectile fired within the range of the electromagnetic range sensing devices The device is operational through the use of a set of concentric range sensing devices 24, 26, 28. These range sensing devices 24, 26, 28 sensing paths are represented by conic sections, that is, they form a cone within the air. The key parameters to focus on are the rate of rotation, the three ($A_1, A_2, A_3$) or potentially more angles with the concentric electromagnetic range sensing devices 24, 26, 28, and the timing associated between the triggering events along with the relative bearing of these events.

As each device rotates, the electromagnetic range sensing devices 24, 26 28 are operative to transmit energy 24C, 26C, 28C via a transmitter or emitter 24A, 26A and 28A and receive reflected signals 24D, 26D, 28D via a receiver 24B, 26B, 28B. This energy transmitted 24C, 26C, 28C by the electromagnetic range sensing devices 24, 26, 28 is transmitted in the same conical pattern as described above. Any signal reflected 24D, 26D, 28D will be reflected into the receiver 24B, 26B, 28B and corresponds to location data of a projectile 38. In an alternative embodiment (not shown) it is possible to deploy the electromagnetic range sensing devices 24, 26, 28 on a plurality of platforms. For example, one platform may have a single electromagnetic range sensing device while the others have two electromagnetic range sensing devices. In a further exemplary embodiment, there is a single electromagnetic range sensing device on a platform and they are operative to share data amongst each other and coordinate as if they were one device.

Figure 8:
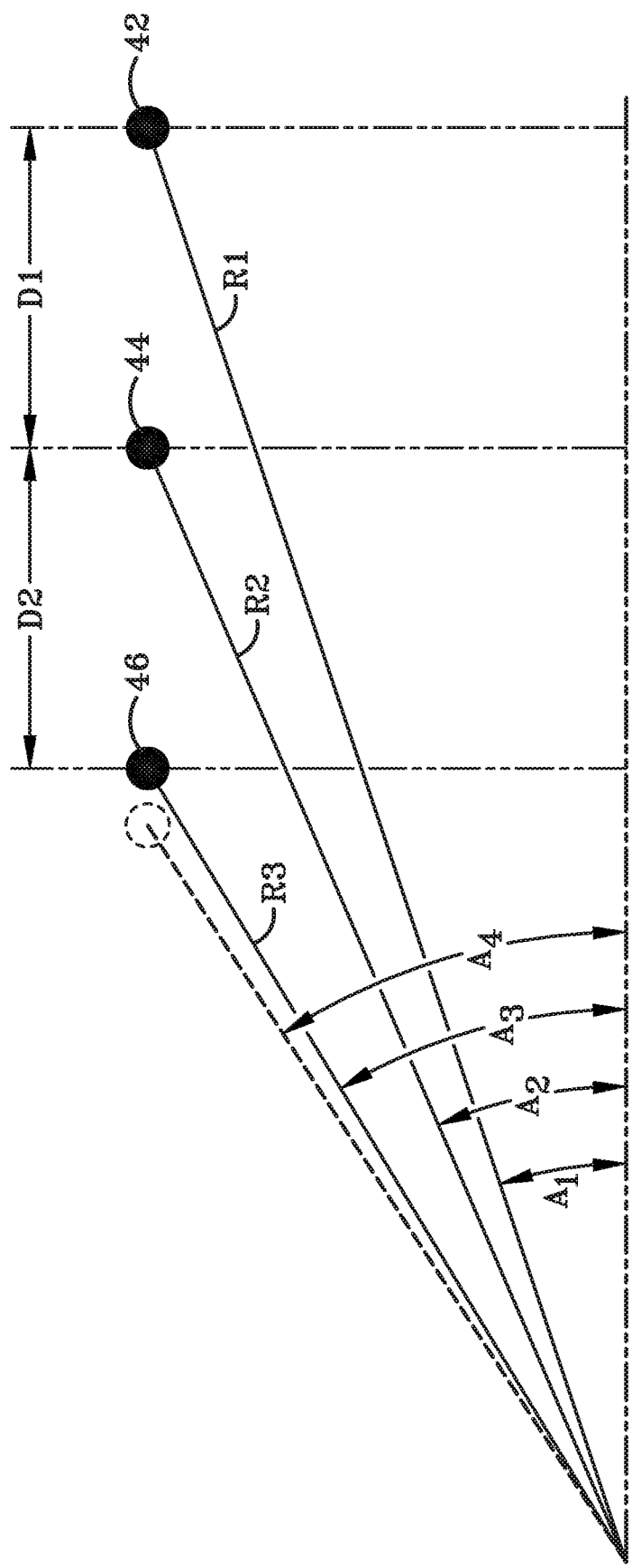
FIG. 8 is a diagrammatic view of a detection example of a projectile.

Referring now to FIG. 8, in the case of three such electromagnetic range sensing devices in a line, as in the exemplary embodiment 24, 26, 28, the first device 24 acts as an initial detection sensor. As the energy is reflected 24D off of an object in the path of the first conical shaped pattern. When the energy returns, this is indicative of an object has been detected within the range of the first electromagnetic range sensing device. As such, the device 10 is engaged to detect the object further to determine if it is a threat, based on its velocity. The distance to the object is referred to as R1. The x,y coordinates may be determined by using the known angle of $A_1$, and using the following formulas $(x_1, y_1)=(R1 \cos A_1, R1 \sin A_1)$. As such, it is possible to know the x,y coordinates using the known angle as a function of cosine and sine, respectively.

Then, as the object moves, it may come into contact with the energy emitted 26C from a second electromagnetic range sensing device 26. If it does not come into contact with this energy 26C within a particular time, then the initial detection is disregarded and deemed not a threat to whatever asset is being protected by the device 10.

However, if it does come into contact with the second energy 26C, it is likewise reflected off of the object 26D in the path of the second conical shaped pattern. Through the use of timing mechanisms within the processor coupled with trigonometry and geometry functions, through known angles, the device is operative to determine the time and speed that the object took to pass into the path. The distance to the object is referred to as R2. The x,y coordinates may be determined by using the known angle of $A_2$, and using the following formulas $(x_2, y_2)=(R2 \cos A_2, R2 \sin A_2)$. As such, it is possible to know the x,y coordinates using the known angle as a function of cosine and sine, respectively. Then, a distance D1 is able to be determined by a distance formula:

$$D1=\sqrt{(x2-x1)^2+(y2-y1)^2}$$

After the distance is determined, a time component may be calculated by using the measured time difference from detection of R1 and R2. In short, this time, or $t_1$, is equal to the time of detection of R1 and R2. Then, by doing this, the velocity may be calculated by dividing the distance D1 by $t_1$. If the velocity is at a high rate, the device may detect the object as a threat. If it were at a slower rate, the device may deem it not to be a threat. These values are pre-set and may be adjusted depending on the object being protected by the device 10 or a plurality of devices deployed for protection.

Subsequent to detecting the object in two electromagnetic range sensing devices 24, 26, the energy 28C of a third electromagnetic range sensing device 28 may come into contact with the object. If it does not come into contact with this energy 28C, then the initial detection through the first two electromagnetic range sensing devices 24, 26 is disregarded as not a threat to the asset being protected.

If it does come into contact with the third energy 26C, it is likewise reflected off of the object in the path of the third conical shaped pattern and returned to the electromagnetic range sensing devices 28 via an energy beam 28D. The distance to the object is referred to as R3. The x,y coordinates may be determined by using the known angle of $A_3$, and using the following formulas $(x_3, y_3)=(R3 \cos A_3, R3 \sin A_3)$. As such, it is possible to know the x,y coordinates using the known angle as a function of cosine and sine, respectively. Then, a distance D2 is able to be determined by a distance formula:

$$D2=\sqrt{(x3-x2)^2+(y3-y2)^2}$$

After the distance is determined, a time component may be calculated by using the measured time difference from detection of R2 and R3. In short, this time, or $t_2$, is equal to the time of detection of R2 and R3. Then, by doing this, the velocity may be calculated by dividing the distance D2 by $t_2$. If the velocity is at a high rate, the device may detect the object as a threat. If it were at a slower rate, the device may deem it not to be a threat. These values are the same pre-set values as discussed earlier and may be adjusted depending on the object being protected by the device 10 or a plurality of devices protecting a target.

Not shown within the FIG. 8, are the parameters B1, B2, B3 which are intended to illustrate angular bearing that is measured at the indicated target approach points for the target of interest which is illustrated by the big dots, 42 being the first big dot, 44 being the second big dot and 46 being the third big dot. Now, through the use of times, distances, angles and other parameters, the device now has a lock on the object that has been detected. As such, appropriate countermeasures may be taken to fire upon the object at its estimated path. Countermeasures may include a shaped charge, a net, a laser, a microwave, a shotgun type slug, a bullet, or other incendiary devices. At the last point of measurement, the target of interest is in a position for which the elimination methodology (kinetic or directed energy) is applied to the threat.

In the present embodiment the device 10 is shown to have twelve sensors, in sets of three on each fin 18 spaced 90° apart from one other. This is merely an exemplary embodiment and in further embodiments more or less than four fins 18 may be used, or more than three sensors 24, 26, 28 on each fin 18 may be implored. The spacing of fins apart will always be consistent. For example, in the instance of 6 fins, they would be spaced apart 60° from one another.

Additionally, the present embodiment of the device 10 is shown to have four countermeasures or alternate effectors 30, or one on each fin. Similar to the sensors 24, 26, 28 and fins 18 discussed above, this is merely an exemplary embodiments and in further embodiments, more or less fins may be used to contain additional countermeasures or more countermeasures may be placed on the fins as appropriate.

As such, the device 10 is operative to use the electromagnetic range sensing devices detections combined with an associated angular orientation of the sensors. This angular orientation may be fixed at manufacture or may be movable relative to specifications. For example, if the device was desired to be utilized to track a hypervelocity projectile that is moving above the Earth, three identifications are suitable for a positive identification, as it may be concluded that any object moving toward the asset at a high speed should be eliminated by use of a countermeasure 30.

Depending on the deployment and mission, it is possible for an imaging device 33 to be combined with the triggering of the device 10. Said imaging device 33 would be operative to implore image recognition and trigger counter-measures 30 in a response to a recognized preloaded image.

Coordination between the sensors 24, 26, 28 is required. As the sensors on each fin rotate and report to a processing unit 36. This processing unit 36 helps to decide if objects are threats based on where they are relative to the device. Additionally, the device 10 must be rotated at precise rates of rotation to adequately diagnose targets and threats. As a result of this rotation, the device is operative to protect from incoming projectiles in a 360-degree direction.

The rotation rate of the device in one example must be at least:

$$\frac{1}{\frac{t1+t2}{3}} \text{Hz.}$$

Typically, however, it will be much higher than this, which means that the object of interest will actually be re-detected many times corresponding to the indicated locations in FIG. 8. The higher the rate of rotation, the more resolved the target will be within the field of view. Additionally, the higher the rate of rotation, the faster projectiles will be better resolved for destruction. As such, the rate of rotation may be fine-tuned depending on the type of target being protected along with the type of projectile that would likely target the protected target.

As seen in FIG. 9, a method 900 of eliminating a threat is shown. The method 900 comprising: transmitting energy from a transmitter array 902, receiving portions of energy back from the transmitted energy by a plurality of receivers corresponding to a potential threat 904, deeming the potential threat an actual threat 906, and deploying countermeasures in response to the actual threat 908.

As seen in FIG. 10, an alternative embodiment method 1000 of predicting location of a target is shown. The method comprising transmitting a first energy from a first emitter 1002, reflecting the first energy off of a projectile 1004, receiving the reflected first energy in a first receiver 1006, transmitting a second energy from a second emitter 1008, reflecting the second energy off of the projectile 1010, receiving the reflected second energy in a second receiver 1012, computing a velocity of the projectile 1014, transmitting a third energy from a third emitter 1016, reflecting the third energy off of the projectile 1018, computing the velocity of the projectile and confirming it to be similar to previous calculation 1020, computing the angular bearing of the projectile 1022, determining a future location of the projectile based on previous computations 1024.

Various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of technology disclosed herein may be implemented using hardware, software, or a combination thereof. When implemented in software, the software code or instructions can be executed on any suitable processor or collection of processors, whether provided in a single computer or distributed among multiple computers. Furthermore, the instructions or software code can be stored in at least one non-transitory computer readable storage medium.

Also, a computer or smartphone utilized to execute the software code or instructions via its processors may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers or smartphones may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

The various methods or processes outlined herein may be coded as software/instructions that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, various inventive concepts may be embodied as a computer readable storage medium (or multiple computer readable storage media) (e.g., a computer memory, one or more floppy discs, compact discs, optical discs, magnetic tapes, flash memories, USB flash drives, SD cards, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" or "instructions" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

All definitions, as defined and used herein, should be understood to control over dictionary definitions, definitions in documents incorporated by reference, and/or ordinary meanings of the defined terms.

"Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like a processor (e.g., microprocessor), an application specific integrated circuit (ASIC), a programmed logic device, a memory device containing instructions, an electric device having a memory, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

Furthermore, the logic(s) presented herein for accomplishing various methods of this system may be directed towards improvements in existing computer-centric or Internet-centric technology that may not have previous analog versions. The logic(s) may provide specific functionality directly related to structure that addresses and resolves some problems identified herein. The logic(s) may also provide significantly more advantages to solve these problems by providing an exemplary inventive concept as specific logic structure and concordant functionality of the method and system. Furthermore, the logic(s) may also provide specific computer implemented rules that improve on existing technological processes. The logic(s) provided herein extends beyond merely gathering data, analyzing the information, and displaying the results. Further, portions or all of the present disclosure may rely on underlying equations that are derived from the specific arrangement of the equipment or components as recited herein. Thus, portions of the present disclosure as it relates to the specific arrangement of the components are not directed to abstract ideas. Furthermore, the present disclosure and the appended claims present teachings that involve more than performance of well-understood, routine, and conventional activities previously known to the industry. In some of the method or process of the present disclosure, which may incorporate some aspects of natural phenomenon, the process or method steps are additional features that are new and useful.

The articles "a" and "an" as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," "an exemplary embodiment," or "other embodiments," or the like, means that a particular feature, structure, or characteristic described in connection with the embodiments is included in at feast some embodiments, but not necessarily all embodiments, of the invention. The various appearances "an embodiment," "one embodiment," "some embodiments," "one particular embodiment," "an exemplary embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +1-0.1% of the stated value (or range of values), +/−1% of the stated value (or range of values), +1-2% of the stated value (or range of values), +/−5% of the stated value (or range of values), +/−10% of the stated value (or range of values), etc. Any numerical range recited herein is intended to include all sub-ranges subsumed therein.

Additionally, the method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

The invention claimed is:

1. A search and protect device comprising:
    a rangefinder including:
        a first transmitter transmitting energy in a pattern about a first angle, said first transmitter operatively coupled to a first receiver;
        a second transmitter transmitting energy in a pattern about a second angle, said second transmitter operatively coupled to a second receiver; and
        at least one third transmitter transmitting energy in a pattern about at least one third angle, said at least one third transmitter operatively coupled to at least one third receiver, said first, second and at least one third transmitter constituting a transmitter array, said transmitter array transmitting energy by the first, second and at least one third transmitter in succession towards an object, wherein reflected energy from the object is received by the first, second and at least one third receiver;
    at least one processor operative to receive the reflected energy and determine if the object is an actual threat;
    at least one alternative effector operative to be deployed towards the object if deemed an actual threat; and
    an electromagnetic radiation detector coupled to the processor, the electromagnetic radiation detector being operative to use image recognition to look at the object and for the processor to determine if the object is the actual threat, independent of the reflected energy.

2. The device of claim 1, further comprising:
    a plurality of transmitter arrays, each transmitter array of the plurality of transmitter arrays are electrically coupled to the other transmitter arrays and to the processor.

3. The device of claim 2, wherein the plurality of transmitter arrays are in a line with one another, disposed at different angles.

4. The device of claim 1, wherein the pattern of the energies of the first, second, and at least one third transmitters are conical shaped.

5. The device of claim 1, wherein the rangefinder is mounted to a movable platform.

6. The device of claim 1, wherein the rangefinder is mounted to an outer wall of a building.

7. The device of claim 1, wherein there are a plurality of rangefinders.

8. The device of claim 1, wherein there are four rangefinders.

9. The device of claim 1, wherein the rangefinder is operative to rotate.

10. The device of claim 1, wherein the first, second, and at least one third transmitters are disposed at adjustable angles.

11. A method of eliminating a threat comprising:
    transmitting energy from a transmitter array; wherein said transmitter array comprises:
        a first transmitter for transmitting energy in a pattern about a first angle, said first transmitter operatively coupled to a first receiver,
        a second transmitter for transmitting energy in a pattern about a second angle, said second transmitter operatively coupled to a second receiver, and
        at least one third transmitter for transmitting energy in a pattern about at least one third angle, said at least one third transmitter operatively coupled to at least one third receiver, said first, second and at least one third transmitter constituting said transmitter array, said transmitter array transmitting energy by the first, second and at least one third transmitter in succession towards an object, wherein reflected energy from the object is received by the first, second and at least one third receiver;
    at least one processor operative to receive the reflected energy and determine if the object is an actual threat;
    receiving portions of energy back from the transmitted energy by a plurality of receivers corresponding to the object;
    prior to determining if the object is the actual threat, calculating a velocity and trajectory of the object as a function of movement from a geospatial location of the object and determining whether a future position of the object is proximate a target;
determining that the object is the actual threat; and
deploying countermeasures in response to the actual threat.

12. The method of claim 11, further comprising prior to transmitting energy mounting said transmitter array onto a movable platform.

13. The method of claim 11, further comprising prior to transmitting energy mounting said transmitter array onto an outer wall of a building.

14. The device of claim 1, further comprising deploying the alternate effector towards the object if deemed the actual threat by the electromagnetic radiation detector.

* * * * *